Patented Feb. 8, 1949

2,461,146

UNITED STATES PATENT OFFICE 2,461,146

REFRACTORY LINING COMPOSITION

William C. Cress, Chicago, Ill., assignor to Whiting Corporation, Harvey, Ill., a corporation of Illinois No Drawing. Application February 5, 1945, Serial No. 576,369

8 Claims. (Cl. 106—68)

This invention relates to refractory mixtures or cements which are especially adapted for use as refractory linings for metallurgical furnaces such as converters, ladles and the bottoms of electric furnaces. More particularly, it relates to silica refractory mixtures or cements of the ramming type which are rammed to the desired thickness and/or shape by means of a pneumatic hammer and then heated to form the refractory lining.

The refractory converter linings of the prior art have not been entirely satisfactory because they have not been sufficiently resistant to the attack of molten ferrous oxide and molten siliceous slag, and have not been able to withstand for any considerable period of time the deleterious effects of the high operating temperatures of steel melting furnaces. Neither have these linings been sufficiently resistant to abrasion, nor have they been able to resist breaking apart due to the sudden temperature changes and to the differential expansion from the large and sharp temperature gradient through the wall.

The refractory linings formed from the refractory mixtures of my invention are markedly superior to the prior art linings in all of the foregoing respects and have a service life not heretofore attainable with any of the prior art refractory linings, in so far as I am aware.

The refractory cement of my invention is a ramming mixture comprising a non-plastic, high quality silica material in comminuted form such as crushed quartzite-ganister, a high quality silica flour and bentonite, preferably of the montmorillonite type. A preferred mixture has the following composition by weight:

| | Per cent |
|---|---|
| ⅜-inch ganister | 50 |
| ⅛-inch ganister | 30 |
| 140-mesh Ottawa silica flour | 14 |
| Western bentonite | 6 |

I have found that the particle size distributions of the materials of my ramming mixture must be controlled in order to obtain fairly uniform packings of maximum density, free of large voids. In general, such results are obtained with a mixture wherein from about 50 to 55% thereof is a coarse fraction varying in particle size from ⅜ inch down to that which will be retained on a 28 mesh screen, about 10 to 12% is an intermediate fraction which will pass through a 28 mesh screen and be retained on a 65 mesh screen, and the balance is a fine fraction which will pass through a 65 mesh screen. A preferred particle size distribution has, approximately, a 55% coarse fraction, a 10% intermediate fraction and a 35% fine fraction and is obtained from the aforesaid mixture. In this connection it is to be understood that both the ⅛- and ⅜-inch ganister as obtained in the open market have a coarse, intermediate and fine fraction and the approximate average breakdown of each is as follows:

| Tyler Standard Scale | | ⅜-In. | ⅛-In. |
|---|---|---|---|
| On 28 mesh | per cent | 69 | 47 |
| Through 28 on 65 mesh | do | 14 | 24 |
| Through 65 mesh | do | 17 | 29 |

The silica flour is very fine and approximately 90% thereof will pass through a 140 mesh screen. The bentonite particles are still finer and approximately 90% thereof are finer than 5 microns.

In general, best results are obtained with a ramming mixture in accordance with my invention wherein the intermediate fraction is held at a minimum of about 10% and wherein the coarse fraction is 55% or close to 55%, but not substantially in excess of 55%. It will be apparent that these particle size distributions can be obtained or approximated readily by proper blending of the constituents of the mixture, for the proportions of these constituents may be varied somewhat from those set forth in the preferred example. Thus, for example, the bentonite may vary from 4 to 8%, the silica flour from 10 to 18% and the balance of the mixture is made up of silica ganister which ranges in particle size from a maximum of ⅜ inch down to fine particles which will pass through a 65 mesh screen.

I have found that the ⅜ inch particles in the coarse fraction of a balanced particle size distribution in accordance with the present invention help knit together the successive rammed layers of refractory lining, thereby producing less marked lamination planes. The bentonite imparts plastic properties to the non-plastic silica ganister and makes a workable mass. The fine silica flour not only adds to the plasticity and working qualities of the mass, making a more flowable mixture on ramming, but since it is purer than silica ganister it makes a more refractory mixture. In addition, silica flour gives the refractory a lower permeability and it reacts more rapidly with the bentonite to produce a solid ceramic bond in the refractory lining as hereinafter described.

In preparing the mixture of refractory material for use in lining the walls of a converter, for example, the refractory material and water are mulled in a muller until the constituents are uniformly blended into a ramming mixture. This usually takes from about 7 or 8 to 15 minutes, depending upon the composition of the refractory mixture and the amount of water used. In general, as much water is added as the refractory mixture will take without puffing or flowing when rammed with a pneumatic hammer. In most instances, water in an amount of from about 6½ to 7½% of the weight of the other constituents is sufficient. Collapsible metal forms are placed in the furnace to shape the lining and the material is rammed into place to the desired thickness, usually from about 4 to 14 inches, with a pneumatic hammer, in accordance with conventional procedures. It is preferred that the lining layer be built up progressively to the desired thickness by ramming only 1 to 2 inch layers of material at a time. After the desired thickness of lining has been rammed in place it is dried as by blowing hot air through the furnace for about 25 hours, then preheated slowly and uniformly for about 4 to 12 hours below red heat and until the whole inside of the refractory lining is at red heat, in accordance with standard procedures.

During the course of the heating of the lining material the bentonite melts (at 2390° to 2462° F.) and reacts with the silica flour and the other fine particles of silica in the mixture to bond the larger ganister particles together. This reaction takes place at temperatures considerably below the elevated operating temperatures of steel melting furnaces and the bond is developed at a lower temperature than is possible with the prior art refractory lining mixes. The bond is a solid bond and develops in depth to an extent not heretofore attainable, not infrequently to some 6 to 8 inches below the surface of the lining. In contrast, the bonds developed in linings made from one of the best of the prior art refractory mixes do not generally extend beyond about 1 to 2 inches below the surface of the lining.

At the surface of the lining to a depth of about ½ to 1 inch, there is a very dense layer which resists penetration of slag and metal. In back of this layer to a depth of about 6 to 7 inches, the lining is a thoroughly sintered, rock-like refractory.

The refractory lining produced from the refractory mixture in accordance with my invention is capable of withstanding considerably higher temperatures than the linings heretofore used and the service life thereof is at least double that of some of the best of the prior art linings. Foundry ladle linings made from my mixtures have given from five to six weeks of service, without requiring patching, whereas one of the best of the prior art ladle linings subjected to the same conditions gave a service life of but one week, with patching.

The refractory mixture of my invention may be sold in dry mixture form and be mulled with water into a ramming mixture at the place of use, or it may be sold in ramming mixture form in hermetically sealed drums or containers to avoid loss of water.

I claim:

1. A composition adapted for use as a refractory lining for converters, ladles and the like consisting of a homogeneous mixture of ganister, silica flour and bentonite, approximately 50% by weight of said mixture consisting of ganister having a particle size varying from ⅜ inch to a particle size which will pass through a 28 mesh screen, approximately 30% by weight consisting of ganister having a particle size varying from ⅛ inch to a particle size which will pass through a 65 mesh screen, approximately 14% by weight being the silica flour and approximately 6% by weight being the bentonite.

2. A composition adapted for use as a refractory lining for converters, ladles and the like consisting of a homogeneous mixture of ganister, silica flour and bentonite, approximately 80% by weight of said mixture consisting of ganister having a particle size varying from ⅜ inch to a particle size which will pass through a 65 mesh screen, approximately 14% by weight being the silica flour and approximately 6% by weight being the bentonite.

3. A composition adapted for use as a refractory lining for converters, ladles and the like consisting of, in homogeneous admixture, approximately 4 to 8% by weight of bentonite, approximately 10 to 18% by weight of silica flour and the balance silica ganister of a particle size varying from ⅜ inch to a particle size which will pass through a 65 mesh screen.

4. A composition adapted for use as a refractory lining for converters, ladles and the like consisting of, in homogeneous admixture, approximately 4 to 8% by weight of bentonite, approximately 10 to 18% by weight of silica flour and the balance silica ganister of a particle size varying from ⅜ inch to a particle size which will pass through a 65 mesh screen and of a grain distribution such that approximately 55% is retained on a 28 mesh screen, approximately 10% passes through a 28 mesh screen and is retained on a 65 mesh screen and approximately 35% passes through a 65 mesh screen.

5. A water-containing ramming composition for use as a refractory lining for converters, ladles and the like, which composition contains, besides the water, no other constituents than solid constituents which consist of a homogeneous mixture of ganister, silica flour and bentonite, approximately 50% by weight of said mixture consisting of ganister having a particle size varying from ⅜ inch to a particle size which will pass through a 28 mesh screen, approximately 30% by weight consisting of ganister having a particle size varying from ⅛ inch to a particle size which will pass through a 65 mesh screen, approximately 14% by weight being the silica flour and approximately 6% by weight being the bentonite.

6. A water-containing ramming composition for use as a refractory lining for converters, ladles and the like, which composition contains, besides the water, no other constituents than solid constituents which consist of a homogeneous mixture of ganister, silica flour and bentonite, approximately 80% by weight of said mixture consisting of ganister having a particle size varying from ⅜ inch to a particle size which will pass through a 65 mesh screen, approximately 14% by weight of said mixture being the silica flour and approximately 6% by weight being the bentonite.

7. A water-containing ramming composition for use as a refractory lining for converters, ladles and the like, which composition contains, besides the water, no other constituents than solid constituents which consist of, in homogeneous admixture, approximately 4 to 8% by weight of bentonite, approximately 10 to 18% by weight of silica flour and the balance silica ganister of a particle size varying from ⅜ inch to a particle size which will pass through a 65 mesh screen.

8. A water-containing ramming composition for use as a refractory lining for converters, ladles and the like, which composition contains, besides the water, no other constituents than solid constituents which consist of, in homogeneous admixture, approximately 4 to 8% by weight of bentonite, approximately 10 to 18% by weight of silica flour and the balance silica ganister of a particle size varying from ⅜ inch to a particle size which will pass through a 65 mesh screen and of a grain distribution such that approximately 55% is retained on a 28 mesh screen, approximately 10% passes through a 28 mesh screen and is retained on a 65 mesh screen and approximately 35% passes through a 65 mesh screen.

WILLIAM C. CRESS.

REFERENCES CITED

The following references are of record in the file of this patent:

UNITED STATES PATENTS

| Number | Name | Date |
|---|---|---|
| 777,995 | Anderson | Dec. 20, 1904 |
| 2,240,159 | Jones | Apr. 29, 1941 |
| 2,256,047 | Dietert | Sept. 16, 1941 |
| 2,348,155 | Shanley | May 2, 1944 |

FOREIGN PATENTS

| Number | Country | Date |
|---|---|---|
| 1,425 | Great Britain | 1874 |
| 158,651 | Austria | 1940 |